T. G. PLANT.
MACHINE FOR INSERTING FASTENERS IN LEATHER.
APPLICATION FILED JUNE 16, 1908.
946,825.
Patented Jan. 18, 1910.
5 SHEETS—SHEET 3.
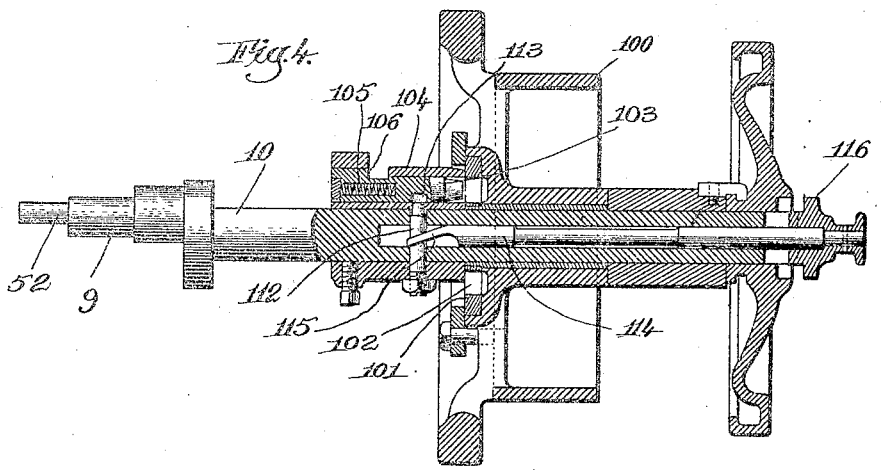
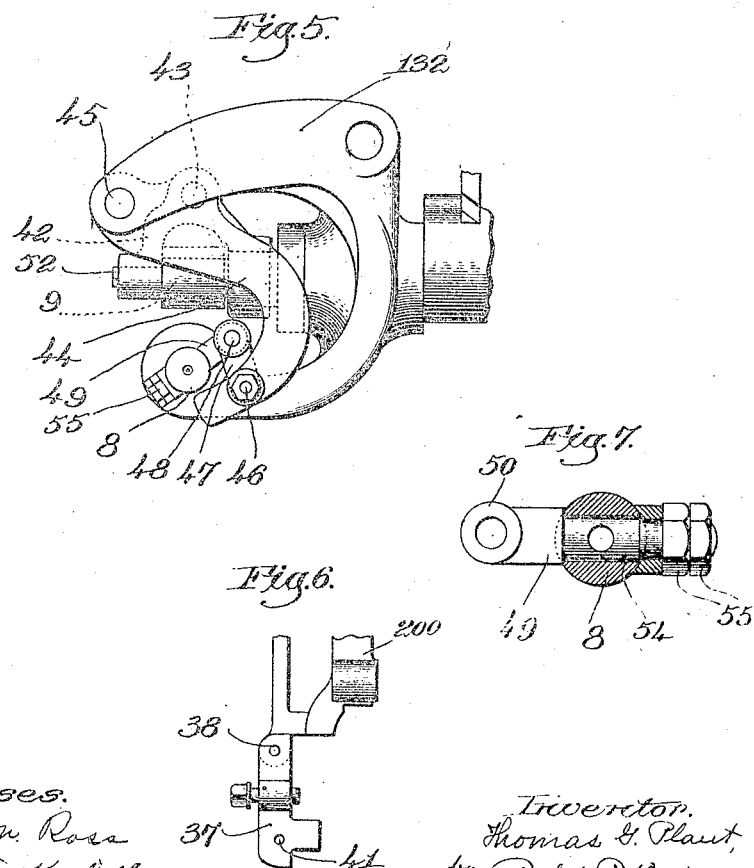

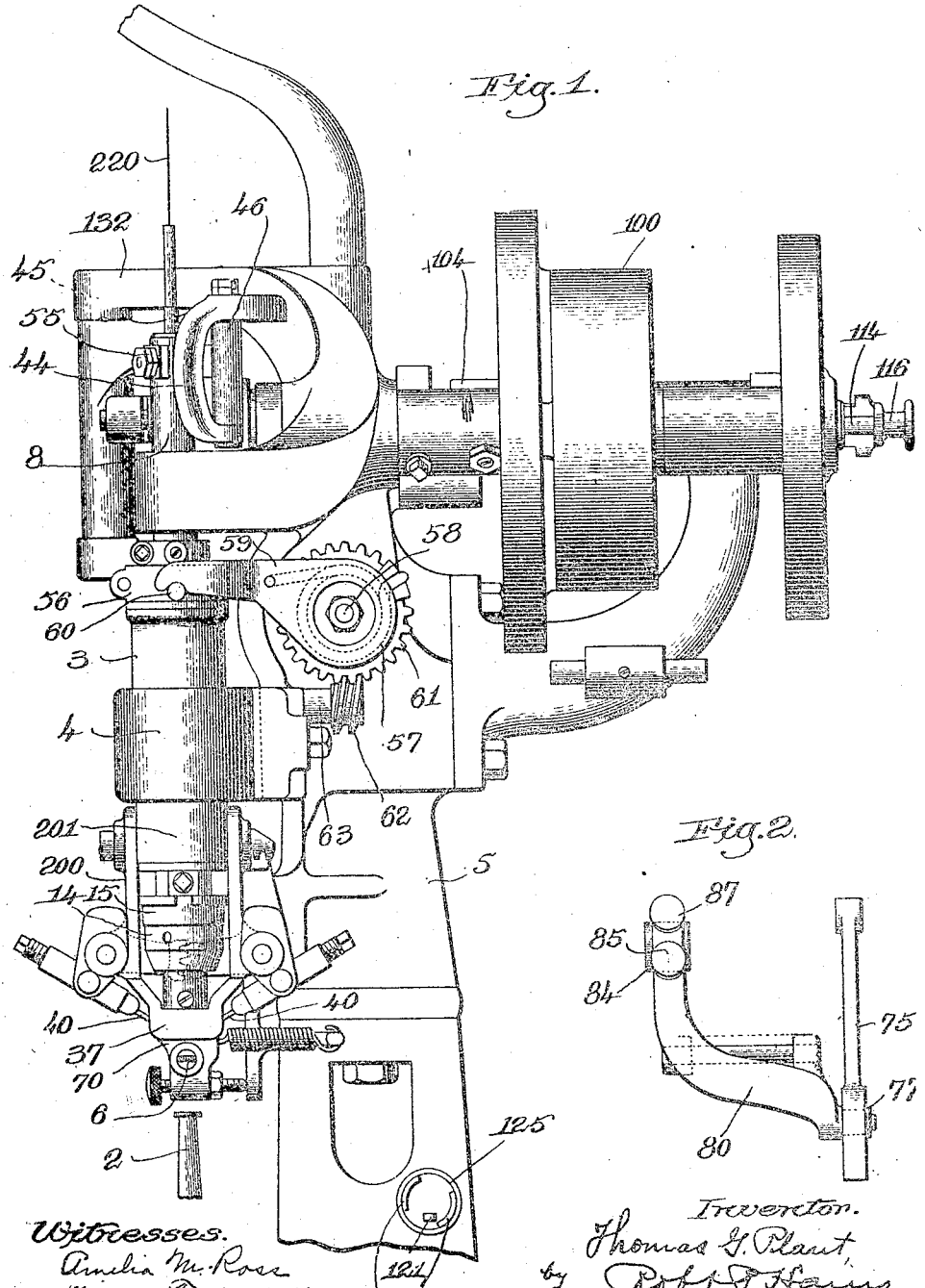

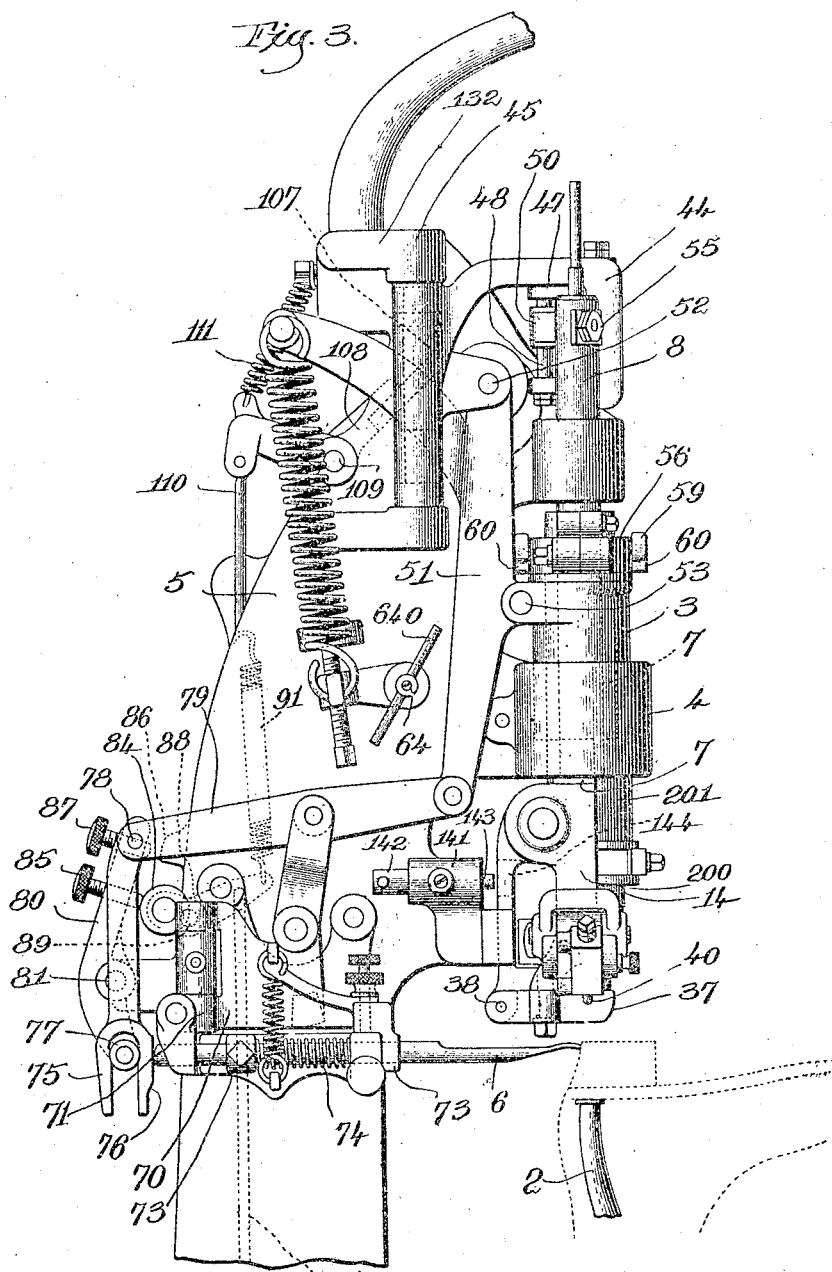

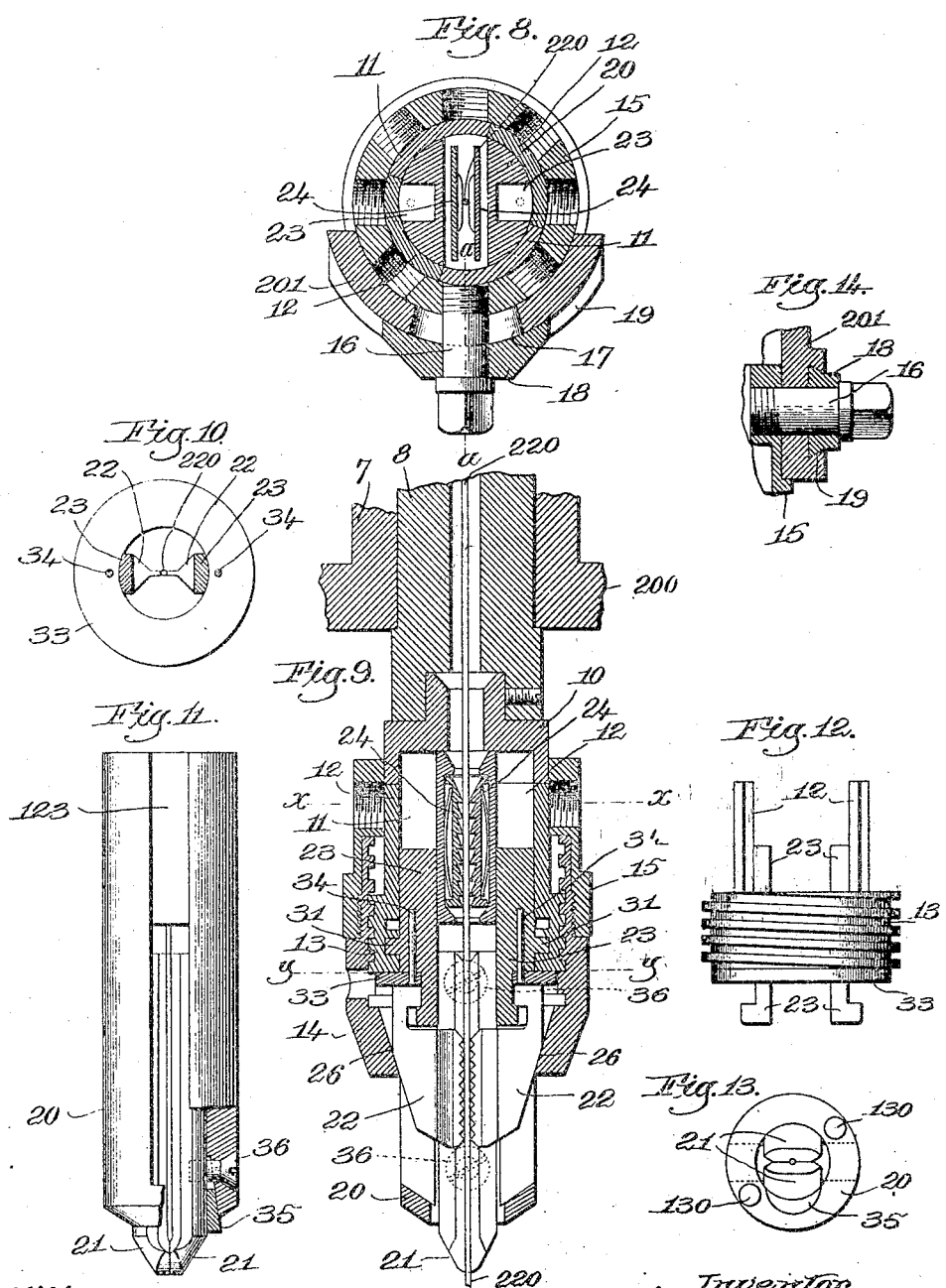

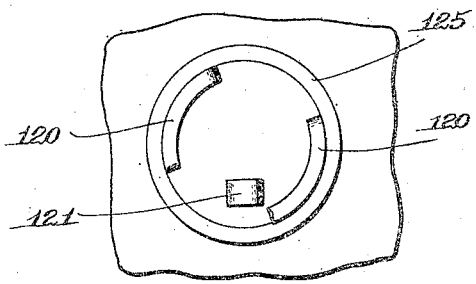
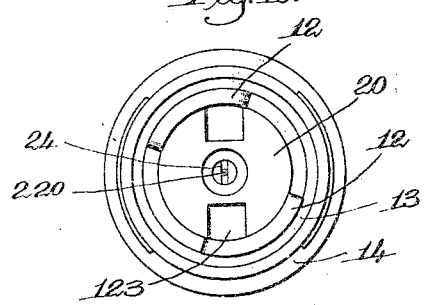
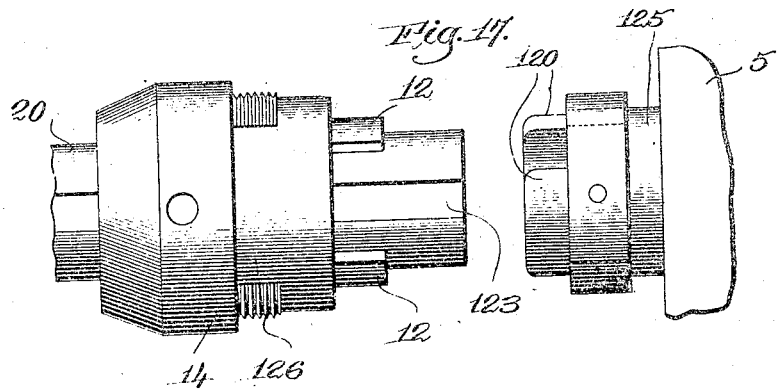

UNITED STATES PATENT OFFICE.

THOMAS G. PLANT, OF BOSTON, MASSACHUSETTS.

MACHINE FOR INSERTING FASTENERS IN LEATHER.

946,825.  Specification of Letters Patent.  Patented Jan. 18, 1910.

Application filed June 16, 1908. Serial No. 438,710.

*To all whom it may concern:*

Be it known that I, THOMAS G. PLANT, a citizen of the United States, residing at Boston, in the county of Suffolk and State of Massachusetts, have invented an Improvement in Machines for Inserting Fasteners in Leather, of which the following description, in connection with the accompanying drawings, is a specification, like characters on the drawings representing like parts.

This invention relates to machines for forming metallic fastenings from wire and inserting such fastenings in leather or other material, and while it is possible to embody the invention in machines for inserting various kinds of fastenings I have, in order to illustrate the features of the invention, elected to show it as embodied in a machine which is known to the trade as a "slugger", that is, a machine adapted to drive the slugs or other fastenings into the heels or soles of boots or shoes. The invention, however, is not limited in all its features to a machine of this particular type.

The general object of the invention is to improve this type of machine in various ways so as to simplify and cheapen the construction thereof and make the machines easier to manipulate.

More specifically the objects of the invention are to provide a novel construction of wire-gripping and wire-feeding mechanism in which the various parts of the mechanism are so arranged that the gripper carriers which sustain the grippers are permanently secured to the gripper-actuating ring so as to avoid all danger of losing these parts when they are removed from the machine; to provide a novel construction by which the throat pieces of the wire-feeding mechanism can be properly adjusted to correspond with any size of wire; to provide a novel form of presser-plate which permits the spindle extension and the grippers to be more readily removed from the working head; to provide a novel feeding mechanism by which the fastenings may be driven either in double row or single row as desired; to provide a novel device by which the spindle extension and the parts thereof may be properly adjusted for any size of wire and relative to each other before inserting them into the working head so that when they are inserted, the proper adjustment thereof will not be destroyed; and to otherwise improve generally the machines of this construction all as will be more fully hereinafter described and then pointed out in the appended claims.

Referring to the drawings, Figure 1 is a front elevation of a head of a machine embodying my invention; Fig. 2 is a detail of the double row attachment; Fig. 3 is a side view of the machine shown in Fig. 1; Fig. 4 is a longitudinal section through the driving shaft showing the stopping and starting mechanism; Fig. 5 is a top plan view of a portion of the head showing the connection between the driving shaft and the spindle; Fig. 6 is a detail of the swinging presser-plate; Fig. 7 is an enlarged sectional view through the upper end of the spindle showing the manner of attaching the crank arm thereto; Fig. 8 is a section on the line *x—x*, Fig. 9; Fig. 9 is a vertical longitudinal section through the wire-gripping mechanism; Fig. 10 is a section on the line *y—y*, Fig. 9; Fig. 11 is a side view of the spindle extension with a portion thereof broken out; Fig. 12 is a detail showing the gripper-actuating ring and gripper carriers; Fig. 13 is a bottom plan view of the spindle extension; Fig. 14 is a section on the line *a*, Fig. 8; Fig. 15 is an elevation of a positioning device adapted for properly positioning the parts of the spindle extension and gripping mechanism preparatory to inserting them in the working head; Fig. 16 is an end view of the spindle extension and associated parts to be positioned; Fig. 17 shows the manner in which the positioning device is used.

Many elements of the machine herein shown are those which are commonly found in machines of this class and are the horn 2 on which the shoe is supported while the slugs are being driven, the feed bar 6 and its operating mechanism by which the work is fed forward, and the working head 3 which moves vertically in a bearing 4 sustained by the head 5 of the machine and which has associated therewith the usual grippers for feeding the wire forward and driving it into the work, gripper-actuating mechanism and the knives or cutters for severing the driven fastenings from the wire. The working head is given an up and down reciprocating motion in the bearing 4 by means of the pitman 51 which is pivotally mounted at its upper end upon the crank 9 of the main driving shaft 10, said pitman being pivotally connected to the working head at 53. The working head is constructed as usual in machines of this class and it is in the form of a sleeve within which is fitted an inner sleeve 7 that carries at its lower end a bracket or head 200 on which are mounted the knives 40 for cutting the driven fastening from the wire 220, said knives being actuated by any suitable or usual mechanism. Situated within the inner sleeve 7 is the spindle 8, said spindle being capable of turning movement within the sleeve but being secured to the sleeve so that it moves vertically in unison with the sleeve. The sleeve 7 has rigid therewith a collar 56 which is adapted to rest against the top of the working head 3, as shown in the drawings, and this collar is acted on by a suitable spring 57 which tends to keep the collar in contact with the working head so that as the working head is raised and lowered by the action of the crank 9 and pitman 51, the sleeve and spindle are moved vertically with the head. In this embodiment of my invention the spring 57 is a coiled spring which is coiled about a stud 58 extending from the frame and one end of the spring is secured to a forked arm 59 pivotally mounted on the stud and having engagement with pins 60 extending laterally from the collar 56, and the other end of the spring being secured to a worm gear 61 which is loose on the stud and which meshes with a worm 62 carried by a shaft 64 which is mounted in a suitable bearing 63 formed on the head 5. The shaft 64 is provided with a handle 640 by which it may be turned. This construction provides a simple means for adjusting the tension of the spring 57, for the tension of the spring may be either increased or decreased by turning the shaft 64 in one direction or the other. The worm 62 operates as a positive lock for the worm gear 61 in all positions thereof. The bracket or head 200 carries at its lower end a presser-plate 37 which is adapted to rest on the work while the fastening is being driven.

In the operation of the device, the working head and the sleeve and spindle are lowered by the crank 9 and the spring 57 until the presser-plate strikes the work when the sleeve 7 and spindle come to rest while the working head continues its downward movement and through the action of the usual grippers forces the wire into the work. The grippers are caused to grip the wire by a turning movement of the spindle 8 as is common in machines of this class, the turning movement which causes the grippers to engage the wire being given to the spindle just before the spindle descends, and the reverse turning movement to cause the grippers to release the wire being given the spindle just after the descending movement and before the spindle rises.

The spindle 8 carries at its lower end, see Fig. 9, a coupling member or chuck 10 provided with downwardly-extended arms 11 that interlock with arms 12 extending upwardly from an externally-threaded ring 13 which I have termed the "gripper-actuating ring." This gripper-actuating ring has screw-threaded engagement with the gripping ring or sleeve 14 which in turn has screw-threaded engagement with a sleeve 15 that is received within and is secured to an apron 201 at the lower end of the working head, and is secured thereto by means of a clamping bolt 16, said bolt passing through a slot 17 formed in the apron 201 and through a clamping jaw or shoe 18 which is dove-tailed to fit a dove-tailed groove 19 formed in the exterior of the apron.

Situated within the gripper-actuating ring 13 is the usual slotted spindle extension 20 which has situated within it at its lower end the two throat pieces 21 that project slightly beyond the spindle extension and form between them the throat through which the wire 220 is led. The spindle extension has received within the slots thereof two grippers 22 which are adapted to engage the wire and feed it forward, said grippers being sustained by gripper carriers 23. The spindle extension has within it the usual upper grippers 24 which are adapted to prevent backward movement of the wire. The spindle extension is held from turning by means of two dowel-pins 130 which extend from the lower end thereof and fit into recesses formed in the presser-plate 37, and the gripping sleeve 14 and the threaded sleeve 15 are also held from turning by the clamping bolt 16 which clamps them to the non-rotatable apron 201. The turning movement of the spindle 8, however, turns the coupling or chuck 10 and the latter through its arms 11 turns the gripper-actuating ring 13 thus screwing said ring up or down in the gripping sleeve 14. The gripper-actuating ring acts on the upper end of the grippers 22 and when said ring is screwed down, the inclined faces of the grippers are forced against the inclined face 26 of the gripper ring thus forcing the grippers inwardly against the wire 220. This is the manner in which the gripping mechanism of machines of this class usually operate and in fact many of the parts thus far described are or may be of any suitable or usual construction except in the particulars hereinafter pointed out.

One feature of my present invention relates to the manner of securing the grippers 22 and gripper carriers 23 in place. In machines as now commonly made these parts are loosely sustained in the slots in the spindle extension and when said spindle extension is removed from the machine for any purpose, the grippers and gripper carriers are very apt to be dislocated from their proper position. Before the spindle extension can be replaced again in the sleeve 7, the grippers and gripper carriers must be replaced in the spindle extension, and with the construction now commonly used this is a matter of more or less difficulty and requires more or less time. Furthermore in the machines as heretofore made the gripper-actuating ring 13 has direct engagement with the ends of the grippers, so that any turning of the ring relative to the gripping sleeve 14 to force the grippers downwardly against the inclined surface 26 of the sleeve 14 to cause them to grip the wire, causes a relative movement between said ring and the grippers. This relative movement, however, is comparatively small so that all the wear between the grippers and the gripper-actuating ring comes on a small portion of the said ring. As a result the ring becomes worn in spots and after it has become thus worn, it will fail to properly operate the grippers to cause them to grip the wire. In my present invention I have provided a novel construction of gripping mechanism wherein the grippers and gripper carriers will be held in the spindle extension and will be prevented from dropping out therefrom when the latter is removed from the working head, and have also provided a novel construction whereby the wear between the grippers and the gripper-actuating ring is eliminated. This feature of my improvement is shown best in Figs. 9 to 12 inclusive. The gripper carriers 22 are permanently secured to the gripper-actuating ring 13 so that they will not become dislodged when the grippers are removed. These gripper carriers each have projecting therefrom a lug 31 which enters a groove formed in the interior of the ring 13, and said gripper carriers are held in place in the ring by being secured to a bearing ring 33 which has bearing against the lower face of the gripper-actuating ring and against the top end of the grippers. While the gripper carriers may be secured to this ring in any suitable way I have shown for this purpose pins 34 which extend up through the bearing ring 33 into the gripper carriers. This provides a construction wherein the gripper carriers are permanently secured to the gripper-actuating ring, as shown in Fig. 12, and hence said gripper carriers will not drop out of place when the ring is removed. The bearing ring 33 also has bearing against the upper ends of the grippers 22, as stated above, and transmits the thrust of the gripper-actuating ring to the grippers. When the gripper-actuating ring is turned by the turning of the spindle in usual manner, said ring turns relative to and bears against the bearing ring 33, and the latter bears against the upper end of the grippers, but has no movement relative thereto. All the wear to which the gripper-actuating ring is subjected therefore is evenly distributed over the entire surface of said ring, and no hollows or recesses will be worn in the lower edge of the ring as is done in the old construction. This gripper-actuating ring, therefore, operates both as a means for holding the gripper carriers in position in the ring even after the grippers are removed and also prevents any wear occurring between the grippers and said ring.

The throat pieces 21 engage the wire 220 immediately above the stock into which it is driven and act to guide the wire while it is being driven. In order to properly guide the wire, said throat pieces should fit the wire closely, for if the wire has any lateral play between said throat pieces the fastenings are apt to be driven out of position or at an improper inclination. In machines of this class as now commonly built, the wire-receiving grooves formed in the throat pieces become worn after the machine has been used some time, so that the wire has sufficient lateral play at the mouth of the groove to negative proper driving of the slug or other fastening. In order to provide for maintaining the throat pieces in proper position at all times, I have provided for adjusting one of the throat pieces as wear occurs so that the wire will always be firmly held by the throat pieces. In the present embodiment of my invention this is accomplished by means of an adjusting wedge 35 which is situated to engage the outside of one of the throat pieces. This adjusting wedge has an interior surface shaped to fit the exterior surface of the throat piece and an exterior surface to fit a wedge-shaped recess formed in the spindle extension 20, as plainly seen in Figs. 11 and 13. The throat pieces and also the wedge 35 are held in place by means of the usual clamping screws 36 which are inserted through the side of the spindle extension into one of the throat pieces. Whenever the throat pieces become worn so that the wire is loose in the wire-receiving groove formed therein, the lower clamping screw 36 can be loosened and the wedge 35 driven upwardly sufficiently to take up whatever wear has occurred, and, when properly adjusted, the wedge may be held in place by tightening the screw 36.

In machines of this class as commonly made, the presser-plate 37 against which the work has contact covers the end of the spindle extension, and in order to remove the spindle extension for making any adjustment therein, or clearing the grippers if they become clogged, or for any other purpose, it has been necessary to first remove the presser plate entirely from the bracket 200. In my present invention I avoid this necessity by pivotally connecting the presser-plate to the bracket so that said presser-plate may be swung down out of engagement with the spindle extension whenever it is desired to remove said spindle extension. In the present embodiment of my invention this presser plate is pivoted at its rear end, as at 38, to the bracket 200 so that said presser plate may be swung down into the position shown in Fig. 6, for instance, in which position it is out of the way of the spindle extension. Said presser-plate is held in its operative position, as shown in Fig. 3, by the usual knives 40 which operate to sever the wire after the fastening is driven. These knives play in apertures 41 formed in the presser-plate 37, and when in position they serve to hold said presser-plate in its operative position. In order to permit the presser-plate to swing downwardly, the knives have to be removed.

My invention also involves an improved connection between the spindle 8 and the mechanism for turning it, which connection is provided with novel means to adjust it for the purpose of taking up any wear which may occur.

The driving shaft 10 is provided with the usual crank portion 52 on which is pivotally mounted the knuckle piece 42 which is pivotally connected at 43 to the yoke 44, the latter being pivoted at 45 to an arm 132 extending from the frame. The yoke 44 extends around the inside of the spindle 8, as plainly seen in Fig. 5, and it has swiveled near its outer or free end as at 46 a supplemental yoke 47 provided with a vertically-extending pivotal rod 48. The spindle 8 has extending from its upper end an arm 49 provided with an eye 50 through which the pivotal rod 48 extends so that said eye can both slide vertically on the rod as the spindle rises and falls and can also turn relative thereto. The rotation of the crank 52 will give the knuckle piece 42 a movement transverse to the axis of the shaft 10, and said knuckle piece will operate to swing the yoke 44 about its pivot 45 thereby through the auxiliary yoke 47 and arm 49 operating to oscillate the spindle 8 about its axis. The turning movement of the spindle 8 is for the purpose of causing the grippers to clamp and release the wire, and it is essential, therefore, that this turning movement should be the proper amount to secure this desired end. I have, therefore, provided an adjustable connection between the spindle 8 and the arm 49 whereby any wear which occurs between the parts may be taken up so that the spindle and gripper-actuating ring may always be turned the proper amount. As herein shown the arm 49 is provided with an eccentric portion 54 which extends through the spindle 8, said arm being clamped to the spindle by suitable clamping nuts 55. When the parts need adjusting on account of wear, the arm 49 may be turned in the spindle 8 bottom side up from what is shown in Fig. 7, thereby shifting the position of the eye 50 laterally from that shown in Fig. 7. This is a simple way of providing for adjusting the eye laterally to take up any slack due to wear of the parts.

Machines of this type are commonly provided with some stop device which when in operative position will limit the downward movement of the spindle so that when said device is in operative position the feeding mechanism will operate in the same way as occurs when a shoe is placed on the horn. Such stop devices are usually arranged at the upper end of the spindle, but in my invention the stop device is arranged to co-act with the bracket portion 200 and is, therefore, in a much more convenient position to manipulate than when it is located at the upper end of the spindle. This stop device is shown in Fig. 3, and is in the nature of a pin 142 slidably mounted in a bearing 141. The end 143 of the pin is adapted to enter an aperture 144 shown in dotted lines Fig. 3 formed in the bracket 200 when said pin is thrown forwardly. While the machine is working the stop pin is in retracted position, as shown in Fig. 3, but if it is desired to operate the wire-feeding mechanism without placing a shoe on the horn, the stop pin 142 is pushed to the right Fig. 3, until the end 143 enters the slot or opening 144. When the stop pin is in this position and the machine is started, the downward movement of the bracket 200 and the sleeve 7 will be arrested by said stop device in substantially the same way as would occur if a shoe were on the horn and the downward movement of the sleeve 7 were limited by the engagement of the presser-plate 37 with the heel of the shoe. The operator can, therefore, watch the operation of the machine and note the amount of wire which is measured off and fed from the machine at each operation thereof. The placing of the stop device in the position shown makes it much easier to manipulate than when it is located at the upper end of the spindle.

My invention also includes an improved double row mechanism by which the slugs or fastenings may be driven in double or single row as desired. The feed bar 6 is operated in usual manner to feed the stock forward, it being mounted in a swinging frame 70 pivoted to the standard 5 to swing about the vertical axis 71. Said feed bar slides back and forth in bearings 73 carried by the frame and is normally retracted by means of the usual spring 74 which surrounds the shank thereof. The rear end of the feed bar engages the usual feed bar actuator 75 which is forked to embrace the fulcrum stud 77 and which is provided with the cam surface 76 to act on the feed bar. Said actuator is pivotally connected at 78 with a lever 79 which in turn is pivoted to the pitman 51 so that the rising and falling movement of the pitman will cause the actuator 75 to rise and fall. These parts are of usual construction and the vertical movement of the actuator operates to give a reciprocating movement to the feed bar through the cam surface 76 and the spring 74 in a well known manner. For providing for inserting the fastenings nearer to or farther from the edge of the heel according to whether the fastenings are to be put in a double or single row, I have provided a treadle-controlled mechanism for positioning the stud 77 toward and from the standard 5. In the present embodiment of my invention said stud is shown as carried by a lever 80 which is pivoted at 81 to a fixed support, such, for instance, as an arm extending from the stand 5. The lever 80, see Figs. 2 and 3, is normally held in the position shown in Fig. 3 by means of a movable stop 84, said lever preferably having an adjusting screw 85 therein to engage the stop, although this is not essential. When the stop 84 is in the position shown in Fig. 3, the feed bar 6 is in the proper position so that the fastenings will be inserted in the outer row near the periphery of the heel. If, however, the stop 84 is moved into its inoperative position, the spring 74 will force the feed bar 6, actuator 75 and stud 77 backwardly into a position which permits the heel to be placed so that the fastenings will be driven in an inside row. The latter position of the stud 77 is secured by a stop or projection 86 on the stand 5 with which the lever 80 or an adjusting screw 87 carried thereby is adapted to engage. I prefer to use the adjusting screws 85 and 87 for engaging the stops 84 and 86, for they provide for more accurately adjusting the feed bar. The stop 84 may be thrown into its operative or inoperative position in any suitable way. As one convenient way I have shown it as mounted on a swinging arm 88 which is pivoted to the stand 5 at 89, see Fig. 3, and which has connected thereto a link 90 leading to suitable treadle mechanism. The stop 84 is normally held in its operative position by means of a spring 91 which is secured to the arm 88. When the rod 90 is drawn down by the treadle, the stop 84, which may conveniently be in the form of a roll, is carried out of its engagement with the adjusting screw 85 thus permitting the upper end of the lever 80 to swing forward until the said screw 87 engages the stop 86.

The shaft 10 is driven from a suitable driving pulley 100 which is loosely mounted on the shaft but which is adapted to be clutched thereto by some suitable clutch mechanism. The clutch device herein shown comprises a clutch ring 101 rigidly secured to the driving pulley 100 and provided with a plurality of apertures 102, into one of which a clutch pin 103 is adapted to be inserted. Said clutch pin 103 plays back and forth in a hub 104 rigid with the shaft 10. A spring 105 tends normally to force the clutch pin forwardly into engagement with the clutch ring 101. The clutch pin 105 is provided with a shoulder 106 which is adapted to engage a wedge-shaped stop or clutch-disengaging member 107 as the shaft rotates, and when said wedge-shaped member does thus engage the shoulder 106, the clutch pin is withdrawn, thus disengaging the clutch. This wedge-shaped clutch-disengaging member 107 is carried by an arm 108 which is pivoted to the frame at 109 and has connected thereto a link 110 leading to a suitable treadle mechanism not shown.

111 is a spring acting on the arm 109 that tends normally to keep the clutch-disengaging member 107 in operative position. The clutch is thrown into engagement by pulling downwardly on the link 110 by means of the treadle mechanism thereby to swing the member 107 out of engagement with the shoulder 106 and permitting the spring 105 to throw the clutch pin forwardly into clutching engagement with the clutch ring. I have provided simple means separate and independent from the member 107 for maintaining the clutch pin disengaged from the clutch ring when it is desired to operate the machine by hand. This mechanism comprises a locking pin 112 mounted in the shaft 10 and movable transversely thereof, the end of said pin being adapted to enter a recess 113 formed in the clutch pin when the latter is withdrawn. This locking pin 112 is controlled as to its position by a controller 114, the end of which is formed into an inclined finger 115 that engages an inclined slot in the locking pin. The controller extends axially of the shaft 10 and at its exposed end has a thumb piece 116 by means of which it may be moved longitudinally. When the controller is withdrawn, as shown in Fig. 4, the locking pin is disengaged from the clutch pin 103 and the clutch is free to be operated by the treadle. When the controller is forced inwardly, however, the clutch pin is moved transversely by the inclined finger 115, thereby to cause the end of the locking pin to engage the notch 113 and lock the clutch pin from movement.

Before the machine is operated it is necessary to adjust the wire-gripping mechanism for the size of wire to be used, so that said gripping mechanism will properly operate on the wire. This is commonly done by removing the spindle extension and the grippers and then taking a short piece of wire and inserting it through said spindle extension between the grippers, and then turning the gripping sleeve 14 and the gripper-actuating ring 13 relative to each other to force the grippers firmly against the wire and thereafter inserting the spindle extension and sleeve 14 back into the working head and securing the sleeve 15 in position by means of the clamping screw 16. This adjustment of the parts when the spindle extension is removed from the machine is more or less difficult and I have provided an improved positioning device which has for its object to assist the operator in thus adjusting the parts for any size of wire. This positioning device is constructed to engage the spindle extension and the arms 12 of the gripper-actuating ring 13 and hold said parts from rotation while permitting the gripping sleeve 14 to be turned thereby to force the grippers against the wire which has previously been inserted through the spindle extension. This positioning device is preferably attached to the frame of the machine in some convenient position, as shown in Fig. 1, and it comprises a cylindrical shell 125 extending from the frame (see Figs. 1, 15 and 17) and from which extends two holding lugs 120. The frame of the machine also has extending therefrom a positioning lug 121 which is situated within the shell 125. The holding lugs 120 are of the same shape as the arms 11 depending from the coupling or chuck 10 and are, therefore, of a shape to fit between the arms 12 extending from the gripper-actuating ring. The positioning lug 121 is of a size to be received in one of the grooves 123 in the spindle extension. In using this device a piece of wire is first inserted through the spindle extension after the latter is removed from the machine, and the end of the spindle extension is then inserted into the shell 125 with the positioning lug 121 fitting the groove 123. The arms 12 are then turned until they interlock with the holding lugs 121. While the parts are held by the positioning and holding lugs the sleeve 14 is turned relative to the gripper-actuating ring 13 thereby to cause the grippers to engage the wire. The relative positions of the holding lugs 120 and positioning lug 121 are the same as the relative positions of the recesses in the presser-plate for the dowels 130 and the arms 11 of the coupling or chuck 10 so that when the sleeve 14 is tightened, the parts are in proper position relative to each other so that when the spindle extension is inserted into the working head the dowel pins 130 will fit the recesses or apertures formed in the presser-plate 37 and the arms 12 of the gripper-actuating ring will fit between the arms 11 of the coupling member 10. The spindle extension and the corresponding parts are held in position after being thus inserted by the clamping screw 16, as above described. After the gripping sleeve 14 has been tightened, however, and before the spindle extension is inserted into the working head, the sleeve 15 is applied to the sleeve 14 and is given a partial turn to cause the threads 126 on the sleeves 14 to interlock with the threads on the sleeve 15.

The drawings show the preferred embodiment only of my invention and no attempt has been made to illustrate other embodiments thereof.

Having fully described my invention, what I claim as new and desire to secure by Letters Patent is:—

1. In a machine for inserting fastenings, the combination with a working head, a spindle therein, a spindle extension, grippers operating in the spindle extension, and a gripper-actuating ring, of means for distributing the wear between the grippers and said ring over the entire end surface of the latter.

2. In a machine for inserting fastenings, the combination with a working head, a spindle therein, a spindle extension, grippers operating in the spindle extension, and a gripper-actuating ring, of a bearing ring interposed between the gripper-actuating ring and the grippers.

3. In a machine for inserting fastenings, the combination with a working head, a spindle therein, a spindle extension, grippers operating in the spindle extension, and a gripper-actuating ring, of a bearing ring interposed between the gripper-actuating ring and the grippers, said bearing ring being secured to the gripper-actuating ring and the latter being free to turn relative to the bearing ring.

4. In a machine for inserting fastenings, the combination with a working head, a spindle and spindle extension therein, gripper carriers slidable in the spindle extension, grippers sustained by said carriers, and a gripper-actuating ring, of means to permanently retain said carriers to said ring.

5. In a machine for inserting fastenings, the combination with a working head, a spindle and spindle extension therein, gripper carriers slidable in the spindle extension, grippers sustained by said carriers, and a gripper-actuating ring, of a bearing ring situated between the gripper-actuating ring and the grippers and permanently secured to the gripper carriers.

6. In a machine for inserting fastenings, the combination with a working head, a spindle and spindle extension therein, wire-gripping mechanism, and throat pieces at the end of the spindle extension through which the wire extends, of a wedge adjustable longitudinally of and engaging one of the throat pieces by which said throat piece may be adjusted relative to the other throat piece, and a clamping screw for holding the wedge in adjusted position.

7. In a machine for inserting fastenings, the combination with a working head, a sleeve therein and movable relative thereto, wire-feeding devices operated by said working head, of a presser-plate pivotally sustained by said sleeve to swing downwardly therefrom.

8. In a machine for inserting fastenings, the combination with a working head, a sleeve therein, a spindle within the sleeve, a spindle extension, wire-heating devices associated with the spindle extension and operated by the working head, and a presser-plate pivoted to said sleeve to swing downwardly therefrom.

9. In a machine for inserting fastenings, the combination with a driving shaft having a crank, of a wire-feeding and driving mechanism including a vertically-extending spindle, a curved yoke pivoted at one end and extending around the inner side of said spindle, connections between said crank and yoke to oscillate the latter by rotation of the former, an arm adjustably connected to and extending laterally from the spindle toward the yoke, and a pivotal connection between said yoke and said arm.

10. In a machine for inserting fastenings, the combination with a spindle, of a yoke, means to oscillate the yoke, an arm extending laterally from the spindle and provided with an eccentrically-situated eye, and a link pivotally and slidably connected to the eye and having a pivotal connection with the yoke.

11. In a machine for inserting fastenings, the combination with a working head and wire-gripping and feeding mechanism operated thereby, of a sleeve situated within the working head, said sleeve having a bracket at its lower end, a presser-plate sustained by said bracket, and a stop device adapted to engage the bracket to limit the downward movement of the sleeve.

12. In a machine for inserting fastenings, the combination with a working head and wire-grippers actuated thereby, of a sleeve situated within the working head and having a bracket at its lower end provided with a slot, a stop pin movably sustained in fixed bearings and adapted when in operative position to engage said slot and limit the downward movement of the sleeve.

13. In a machine for inserting fasteners, the combination with a work support and work positioning means, of devices connected to said work positioning means to determine any one of a plurality of positions thereof, a stop to limit the movement of said work positioning means, means for moving said stop out of operative position, a second stop coöperating with the work positioning means when said first stop is out of operative position, and means to insert a plurality of fastenings successively with the work positioning means in any one of said plurality of positions.

14. In a machine for inserting fastenings, the combination with a work support and a feed bar, of means to position the feed bar in any one of a plurality of positions, a stop to limit the movement of said means, means for moving said stop into and out of operative position, and means to insert a plurality of fastenings successively with the bar in either position.

15. In a machine for inserting fastenings, the combination with a working head and a spindle therein, of a spindle extension detachable from the working head, grippers and a gripper-actuating ring carried thereby, of means separate from the working head to position the spindle and the gripper-actuating ring properly relative to each other prior to placing them in the working head.

16. In a machine for inserting metallic fastenings, the combination of a working head, a sleeve therein, a spindle within the sleeve, a removable spindle extension having projecting dowel portions, wire feeding devices, and a presser plate having recesses for engaging the dowel projections, said presser plate being pivoted to the said sleeve to swing downward to permit the proper assembling of the parts.

17. In a machine for inserting metallic fastenings, the combination of a working head and wire gripping and feed mechanism operated thereby, a sleeve situated within the working head, a presser plate sustained by said sleeve, and a stop pin disposed adjacent the lower portion of the sleeve to limit the downward movement of the sleeve when the machine is operated for trial.

18. In a machine for inserting fastenings, the combination of a working head, a spindle extension detachable from the working head, grippers and a gripper actuating ring, and means comprising the part 125 and lugs 120 separate from the working head to position the spindle and gripper actuating ring properly relative to each other prior to placing them in the working head.

19. In a machine for inserting metallic fasteners, the combination of a working head, a sleeve therein and movable relative thereto, a spindle within the sleeve, a spindle extension, wire feeding devices associated with the spindle extension and operated by the working head, a bracket connected to the sleeve, and a presser plate pivoted to the bracket adjacent the lower end of the spindle extension to swing in a direction downward and away from the end of the spindle extension.

In testimony whereof, I have signed my name to this specification, in the presence of two subscribing witnesses.

THOMAS G. PLANT.

Witnesses:
F. IRENE CHANDLER,
FREDERICK L. EMERY.